US008856752B2

(12) United States Patent
Rosen et al.

(10) Patent No.: US 8,856,752 B2
(45) Date of Patent: Oct. 7, 2014

(54) MONITORING ASSET STATE TO ENABLE PARTIAL BUILD

(75) Inventors: Douglas J. Rosen, Woodinville, WA (US); Xin Yan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1220 days.

(21) Appl. No.: 11/977,981

(22) Filed: Oct. 26, 2007

(65) Prior Publication Data

US 2009/0113396 A1    Apr. 30, 2009

(51) Int. Cl.
G06F 9/44    (2006.01)
(52) U.S. Cl.
CPC ..................................... *G06F 8/71* (2013.01)
USPC .......................................... 717/127; 717/145
(58) Field of Classification Search
None
See application file for complete search history.

(56) References Cited

U.S. PATENT DOCUMENTS

| | | | |
|---|---|---|---|
| 5,325,533 A | | 6/1994 | McInerney et al. |
| 5,367,683 A | * | 11/1994 | Brett .............................. 717/136 |
| 5,586,328 A | * | 12/1996 | Caron et al. .................. 717/146 |
| 5,758,160 A | | 5/1998 | McInerney et al. |
| 7,174,535 B2 | | 2/2007 | Wragge |
| 2004/0268345 A1 | | 12/2004 | Lodwick et al. |
| 2005/0091230 A1 | | 4/2005 | Ebbo et al. |
| 2005/0278579 A1 | | 12/2005 | Hill et al. |
| 2007/0006176 A1 | | 1/2007 | Spil et al. |
| 2007/0168940 A1 | | 7/2007 | Lunawat |

OTHER PUBLICATIONS

"DocProject's Build Process", http://www.codeplex.com/DocProject/Project/ProjectRss.aspx?ProjectRSSFeed=codeplex%3A%2F%2Fwiki%2FDocProject, 2006.
"Deployment Descriptions in a World of COTS and Open Source"., http://www.cs.cmu.edu/~wjh/papers/DeployDesc.html, 1999.
Li, et al. "Periodic Partial Validation: Cost-effective Source Code Validation Process in Cross-platform Software Development Environment"., pp. 1-6, 2004.

* cited by examiner

*Primary Examiner* — Lewis A Bullock, Jr.
*Assistant Examiner* — Christine Dang
(74) *Attorney, Agent, or Firm* — Kevin Sullivan; Brian Haslam; Micky Minhas

(57) ABSTRACT

When an up to date state has been achieved for the inputs and outputs of a build process, an asset state indicator is set to indicate that all the inputs and outputs are up to date. Those inputs and outputs are monitored. If a change to any of the inputs and/or outputs is detected, the asset state indicator is updated to indicate that some build execution is needed. When a build request is detected, the current state of the asset state indicator is exposed. An execution sequence for targets of the build process based on dependencies between targets is determined. A starting point for a partial build is determined by determining the earliest-appearing target in the sequence that is affected by the detected changes to the inputs and outputs to the targets of the execution sequence. Executing the build process from this starting point will produce the updated outputs and return the system to the up to date state.

20 Claims, 5 Drawing Sheets

MONITORING ASSET STATE TO ENABLE PARTIAL BUILD

BACKGROUND

Years ago, in the infancy of the computer age, it was not uncommon for a single programmer to develop a software application. Building a simple application often required no more than compiling it. Today, however, software applications are much more complex. Typically a software application is the work product of teams of programmers with each individual programmer responsible for only a small part of the total project. Today's typical build process may include many steps, including: getting the latest versions of source files from a version control system, specifying build options and configurations, recompiling the libraries and packages used by the application, building the application, creating an installation package or packages that install the software application and its deliverable files on a computer system and more.

Applications can be built manually or they can be built by creating batch files or script routines. Building an application manually is often tedious, repetitious, inefficient and prone to errors. For example, specifying an incorrect build version number or compiling an application with incorrect options is very easy to do. Creating batch files may require working on the command line and typically does not provide an easy way to handle errors, monitor build status, stop the build, etc. Also, some tasks simply cannot be done on the command line. Creating a script routine to perform the desired build steps is not easy either. In addition to writing script to perform the specific steps needed for the build, the execution log should be maintained and errors should be handled, etc.

Automated build solutions typically use pre-existing modifiable scripts to build an application or group of programs. Automated build solutions solve some of the problems described above, but one problem shared by all build methods is the length of time it takes to build large projects. Builds of typical large software systems still take hours, if not days, despite the tremendous advances in CPU and disk speeds in recent years.

SUMMARY

The collection of development assets for a particular build process are identified. When all the development assets of the build process are current (up to date), an asset state indicator is set to an initialization value indicating that all development assets in the build process are up to date. Each development asset is monitored between builds. If any development asset in the collection changes, the asset state indicator is reset to some value that indicates that at least one development asset is no longer up to date and therefore some part of the build process has to be run to return the development assets to an up to date state.

When a build request is received, no evaluation needs to take place to determine if the development assets are up to date. Instead, the asset state indicator is examined. If the indicator is still set to the initialization value, a build is not needed to get the development assets up to date. If the indicator is not set to the initialization value, then some build execution is needed to get the development assets up to date. By looking at the asset or assets that changed and determining the first part in an execution sequence affected by the asset or assets that are not up to date, it can be determined where in the sequence of build actions a partial build can start to return all development assets to an up to date state. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
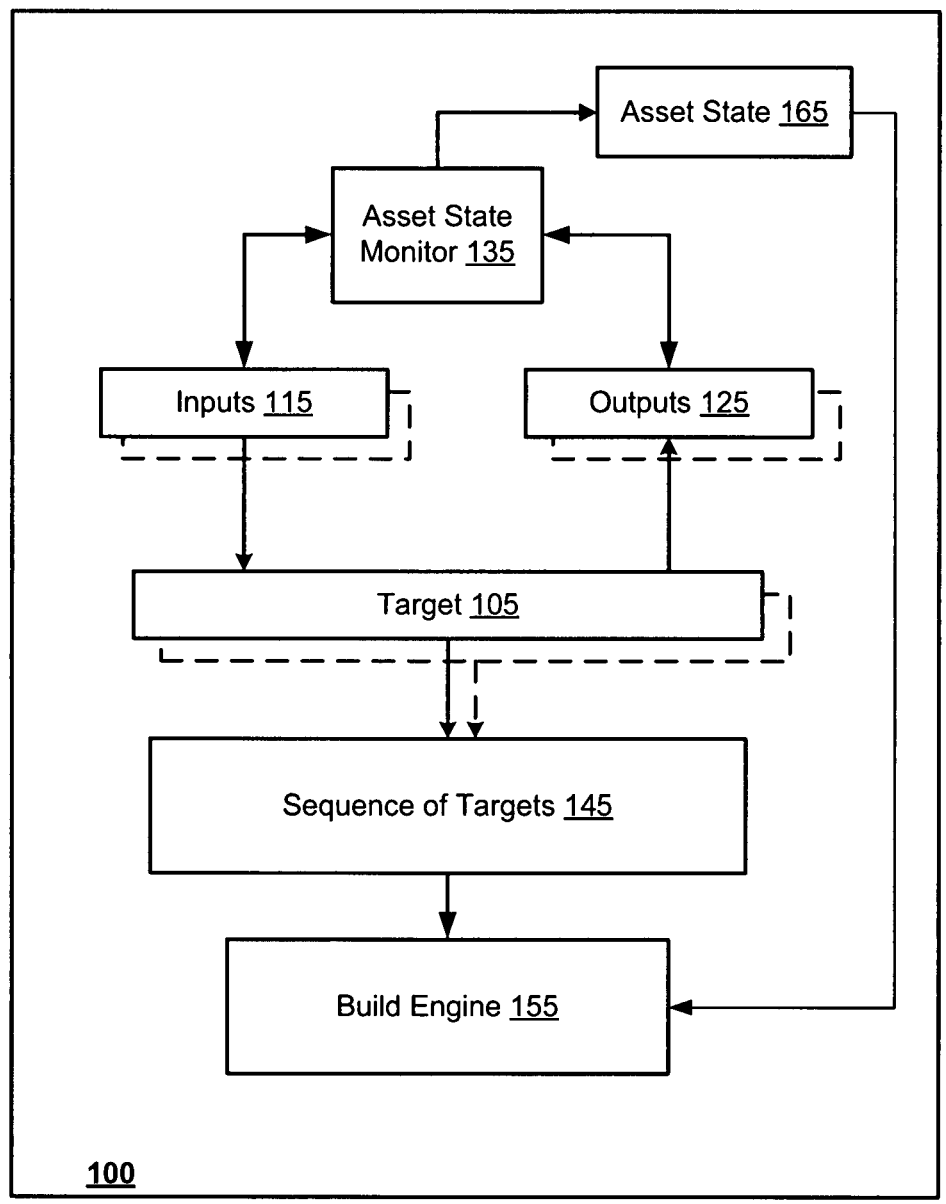
FIG. 1 is a block diagram of an example of a system that monitors state of development assets to enable a partial build in accordance with aspects of the subject matter disclosed herein.

Build systems and build platforms need the ability to execute any number of actions during a build process. A build process may be organized into a sequence of named processing units to be executed. Sometimes the processing units are called targets, where each target includes one or more actions or tasks to be executed sequentially by an automated build system. Creation of a target enables tasks to be grouped together in a particular order and may provide an entry point into the build process. A task is a unit of executable code used by the build system to perform atomic build operations. Hence, a very simple target might operate to compile a source file (e.g., foo.cs) into an executable (e.g., foo.exe) and another target might operate to deploy the executable to some particular location (e.g., copy foo.exe from a local machine to a remote location).

Each task, and therefore, each target, may have one or more inputs and one or more outputs. That is, each task and therefore, each target may be affected by one or more development assets. The set of inputs to one target, or task within the target, may be the set of outputs from another or the set of outputs from one target, or task within the target, may be the set of inputs to another.

In the above example, the input to the compile target is the source file (e.g., foo.cs) to be compiled and the output is the executable (e.g., foo.exe). The output of the compile target (the local copy of foo.exe) is the input to the deploy target. The output of the deploy target could be the copy of foo.exe in its new location. Thus, one target may be dependent on another target. In the example above, the deploy target is dependent on the compile target because the executable cannot be copied to its deployment location unless it has been created first. It will be appreciated that the examples given are for illustration only and do not constitute limitations of the subject matter disclosed herein. Targets and tasks could be compiles, deploys, transformations or anything capable of being executed on a computer. Similarly inputs and outputs are development assets and could be targets, tasks, source files, executable files, intermediate language files, object code, native code, metadata, parameter files, or anything that can be monitored or has a presence outside of the project or is not destroyed when the build process is over.

An incremental build reuses the results of a previous build to perform an optimized build based on the changes since the last build. Typically, however, known systems that perform an incremental build, do so by examining each target to determine if that target should execute. Information from various sources is obtained and analyzed. To determine if a compile target's inputs and outputs are up to date, information available from a source code repository such as the file system or version control system may be obtained. Timestamps or versions between inputs and outputs can be compared. For example, if the timestamp for the executable foo.exe is greater than or equal to the timestamp for the source code foo.cs, it is expected that foo.exe is up to date. Alternatively, if the timestamp for foo.exe is less than that for foo.cs, foo.exe is probably out of date and therefore foo.cs should be recompiled. To determine if the deploy target's inputs and outputs are up to date, the timestamp of the remote location executables could be compared with the timestamps of the local executables. To determine if the deploy target's inputs are up to date with the compile target's outputs, the timestamp of the deploy target's input foo.exe could be compared to the timestamp of the compile target's output, foo.exe. Lists can also be compared to determine currency. For example, if foo.exe does not exist in the list of outputs of a target but foo.cs exists in the list of inputs to the target, the target may be outdated and need to be executed so that foo.cs is compiled to generate foo.exe.

Although helpful, incremental builds can still take a lot of time. For example, it may take a large amount of time for an automated build system to determine that a project is up to date and that no targets have to be executed because of the evaluation and analysis that must take place. The subject matter disclosed herein addresses these and other aspects of automated build processes by monitoring development assets such as inputs to and outputs from units of a build process (e.g., targets or other named sections of a build process) to enable a partial build, in which only those targets affected by an out of date development asset are executed. That is, because a build target only needs to be executed when its inputs and/or outputs are out of date, only the targets whose inputs and/or outputs are out of date and any targets that depend on the out of date targets need to be executed to return all the development assets to an up to date state. Thus, if any of the inputs to or outputs from a target changes, the target is out of date. The out of date target and any target that depends on the out of date target should be executed so the development assets are once more up to date. This approach bypassed analysis for all targets that exist prior to the known out of date ones in the build sequence, thus saving time.

When a known up to date state has been achieved (such as after a build has been completed and therefore all development assets are up to date), a state indicator can be set to an initialization value. The initialization value indicates that all inputs and outputs of the build process are up to date. The collection of inputs and outputs for each target in the build process are identified and/or received or obtained. The targets on which a particular target depends are its dependencies. Similarly any input to or output from a (first) target on which another (second) target depends can be considered a dependency of the dependent (second) target. A dependency graph can be generated from the dependencies, and an execution sequence for the targets can be determined so that an appropriate order of execution respecting dependencies between targets can be obtained. Each input and each output of each target in the execution sequence is monitored between builds. If any development asset in the collection changes, the asset state indicator is updated to some value different than the initialization value or to one of a set of values different than the initialization value. The updated value indicates that at least one target should be executed to bring the development assets back to an up to date state. A table of development assets and the state ("changed" or "unchanged" or "up to date" or "not up to date" or the like) of each asset may be maintained and/or a list of changed assets may be maintained or the state of the development assets can be "remembered" in some other way.

When a build request is received, no evaluation needs to take place to determine if the development assets are up to date: instead, the asset state indicator is examined. If the asset state indicator is still set to the initialization value, no build is required because the development assets are up to date. If the state indicator is not still set to the initialization value, then some build execution is required to bring the development assets to an up to date state. An execution sequence is a sequence of targets that in a full build are executed in a linear fashion in the order presented starting with the first target in the execution sequence and continuing on executing each target in turn until all the targets in the execution sequence from first to last have been executed. A correct execution sequence presents targets in an order such that a target is not executed until all of the targets on which it depends are executed. Given such a target execution sequence, by looking at the set of assets that changed and determining the first or earliest-appearing target in the execution sequence affected by any of the development assets changed, it can be determined where in the sequence of targets a partial build can be started to return the assets to an up to date state. Each target in the execution sequence has the potential to be the entry point for a partial build.

Monitoring Asset State to Enable a Partial Build

A build target needs to be executed when its outputs are out of date with respect to its inputs, or when its inputs are out of date with respect to a target on which it depends. Thus, if any of the inputs to or outputs from a target changes, that target and any target that depends on it should be executed to return the development assets to an up to date state. After a known up to date state has been reached (typically, after a build has been completed so it is known that the inputs to and outputs from the targets making up the build are up to date), internal state is set to indicate the state of the inputs and outputs (i.e., the state conceptually is "up to date"). From this known state of the development assets, overall asset state ("up to date" or "not up to date", "current" or "not current" or the like) is maintained by monitoring changes to the inputs and outputs of all the targets of the build process. If a change to an input or output is detected, the asset state indicator is updated.

When a build request is received, the asset state indicator is checked. If the asset state indicator still has the value to which it was initialized, no assets were changed and an essentially instantaneous response to the build request indicating that no build is required can be made. The response is essentially instantaneous because, unlike known build systems, no evaluation of development assets has to take place to determine if a build is required. Similarly, if the asset state indicator no longer has the value to which it was initialized, at least one target has to be executed and an essentially instantaneous response to a build request based on the value stored in the asset state indicator can be returned, indicating that some execution is needed to return the development assets to an up to date state. If execution of at least one target is required, the build engine can be informed where in the sequence of targets to start the partial build.

One or more of: a collection of targets comprising a particular build, a collection of targets on which each of the targets in the build is dependent and a collection of inputs to and outputs from each target in the build may be identified. A dependency graph can be generated from this information and an execution sequence for the targets can be determined. By looking at what the asset state indicator is set to, and determining the first target that uses an out of date development asset, it can be determined where in the sequence of targets the partial build should start to return all development assets to an up to date state. This information may be provided to the build engine which then is able to perform only a partial build, starting with the first target in the sequence that is affected by the not up to date development asset and continuing on to execute each target following the first affected target in the execution sequence.

FIG. 1 is a block diagram showing an example of a system 100 that keeps track of the state of development assets between builds to enable a partial build in accordance with aspects of the subject matter disclosed herein. The system may comprise a portion of an integrated development environment (IDE) such as the ones described and illustrated below with respect to FIG. 6, residing on one or more computers such as the computers described with respect to FIG. 5, also described below. Alternatively, system 100 may be provided as a stand-alone system or as a plug-in.

System 100 may be incorporated into an automated build system or build engine or may be separate there from. The system may include one or more of the following: a development asset state monitor 135 that monitors one or more development assets comprising one or more inputs 115, etc. to a target 105 and one or more outputs 125 from the target 105 for a change in state. Asset state 165 may represent an asset state indicator that is set by the state monitor 135 to an initialization value after a known good (up to date) state has been reached. Such a state is typically reached immediately after a full or incremental build has been completed and before any changes have been made to the development assets, when it is known that all development assets are up to date. That is, during the period of time after a build and before any changes are made to development assets, the inputs to targets of the build process are up to date with all the outputs from the targets of the build process and the outputs of a first target are up to date with respect to the inputs of a second target dependent on the first. Hence the initialization value indicates that inputs and outputs of all the targets of the build process are up to date and that none of the targets has to be executed to return the development assets to an up to date state.

State monitor 135 monitors all the inputs 115, etc. and all the outputs 125, etc. to all the targets 105, etc. in the sequence of targets 145 which make up a particular build to be performed by build engine 155. Each target 105, etc. of the sequence of targets 145 is associated with a collection of inputs 115, etc. and outputs 125, etc. The collection of inputs and outputs associated with a particular target may be provided to the state monitor 135 by an execution model that collects and provides this information to the state monitor 135 using information obtained and saved from a previous build or may be provided manually or in other known ways. A correct execution sequence of the targets may be determined from a dependency graph. The dependency graph can be built from information available from an execution model that collects and provides this information to the state monitor 135 using information obtained and saved from a previous build, manually or by other known means. The asset state monitor 135 itself may generate the dependency graph and a sequence of execution of targets can be generated from the dependency graph. Alternatively, the execution sequence may be determined directly from the dependency information available from the execution model or by other means. The sequence of execution is determined such that a particular target (e.g. target A) is not executed until all the targets on which that target (target A) depends are executed. The state monitor 135 may generate the execution sequence of the targets.

It will be appreciated that in a well-formed project, an execution sequence for the targets will respect the dependencies of all the targets. The state monitor 135 may monitor target input and output changes and when a request for a build is received can immediately respond to the request with information that either no build is required or that some build execution is required. If some execution is required, the collection of targets that uses the out of date asset may be determined by analyzing the dependency graph or by analyzing dependency information. An execution sequence respecting target dependencies is provided or generated. That is, an execution sequence presents target in an order such that target is not executed until all the targets on which it depends are executed. Thus, a collection of targets is executed, and then the targets that depend on that collection of targets are executed until the end of the execution sequence is reached. The partial build described may be initiated at any point in the execution sequence where the first affected target is found.

Figure 2:
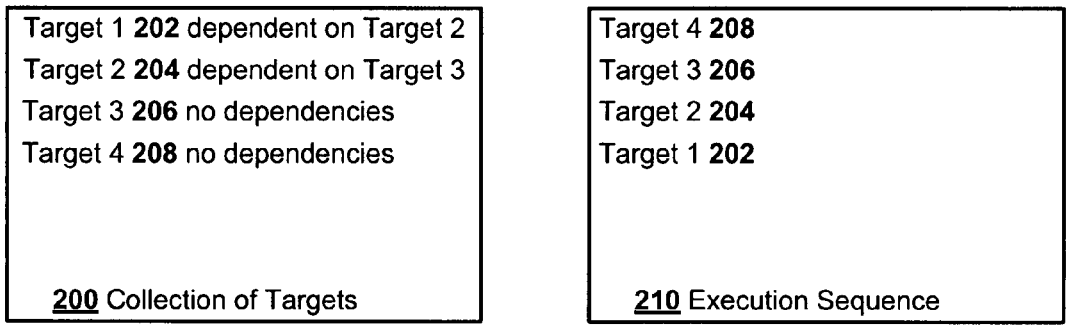
FIG. 2 is an example of a collection of targets and a corresponding execution sequence in accordance with aspects of the subject matter disclosed herein.

Thus, suppose, as shown in FIG. 2, a collection of targets 200 for a particular build comprises: Target 1 202 dependent on Target 2 204, Target 2 204 dependent on Target 3 206, Target 3 206 having no dependencies and Target 4 208 having no dependencies. One possible execution sequence respecting each target's dependencies may be the execution sequence shown in execution sequence 210, in which Target 4 208 is executed before Target 3 206. The execution of Target 3 206 is followed by the execution of Target 2 204 and the last target in the execution sequence 210 is Target 1 202. (It will be appreciated that there may be more than one possible execution sequence respecting each target's dependencies. For example, in the case of the targets illustrated in FIG. 2, another possible execution sequence is Target 3 206, Target 4 208, Target 2 204, Target 1 202.)

Suppose now that state monitor 135 detects that an input of Target 3 has changed and updates asset state indicator 165 to indicate that a target is out of date or that a particular target (e.g., Target 3) is out of date. When a build request is received, a response to the build request can be sent essentially immediately because the asset state indicator will reflect that at least one asset is out of date. Target 4 208 does not need to be executed because Target 4 208 is not dependent on any other targets, and none of the inputs to or outputs from Target 4 208 are out of date. Target 3 206 will need to execute because one of its inputs has become out of date. Target 2 204 will need to execute because Target 2 204 depends on Target 3 206. Target 1 202 will need to execute because Target 1 202 depends on Target 2 204. Hence any change made to Target 3 206 will affect Target 2 204 and any change made to Target 2 204 will affect Target 1 202. Hence, a partial build may be initiated in execution sequence 210 starting at Target 3 206. The partial build in the example will execute Target 3 206 followed by Target 2 204 followed by Target 1 202. Similarly, suppose that one of the outputs of Target 2 204 has been deleted (detected by comparing lists of inputs and outputs as described above).

Target 2 204 may need to be executed to recreate the deleted output and Target 1 202 may need to be executed because Target 1 202 depends on Target 2 204. Hence, a partial build may be initiated starting at Target 2 204. The state monitor 135 may determine the target at which the partial build should start and provide this information to the build engine 155.

Figure 3:
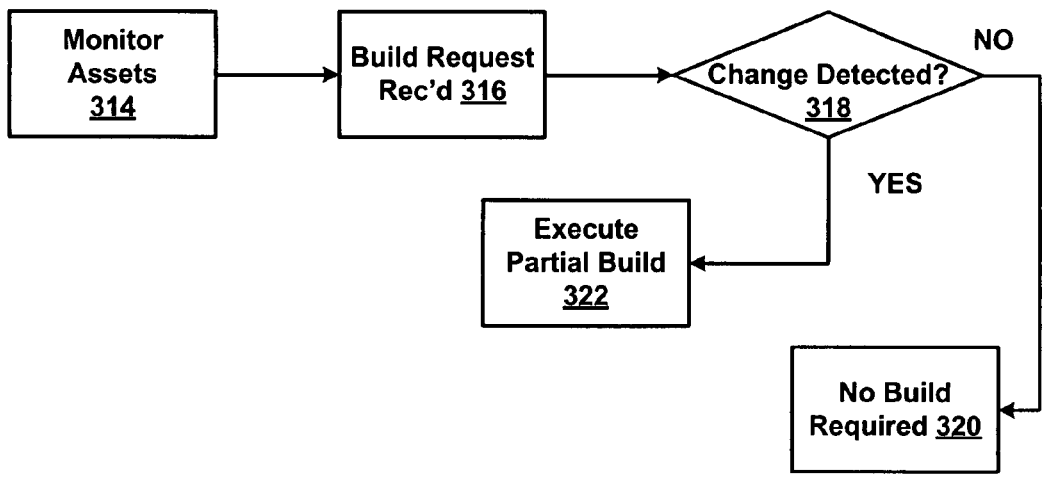
FIG. 3 is a high-level flow diagram of an example of a method for using development asset state to enable a partial build in accordance with aspects of the subject matter disclosed herein.

FIG. 3 illustrates an example of a method for using state to enable a partial build. At 314, inputs to and outputs from a collection of targets for a particular build process are monitored between builds. At 316, when a build request is received, the asset state is examined (318). If a change to an asset rendering that asset or another asset out of date has occurred (asset state has changed) a partial build is required (322). If no assets have changed, no build is required (320).

Figure 4:
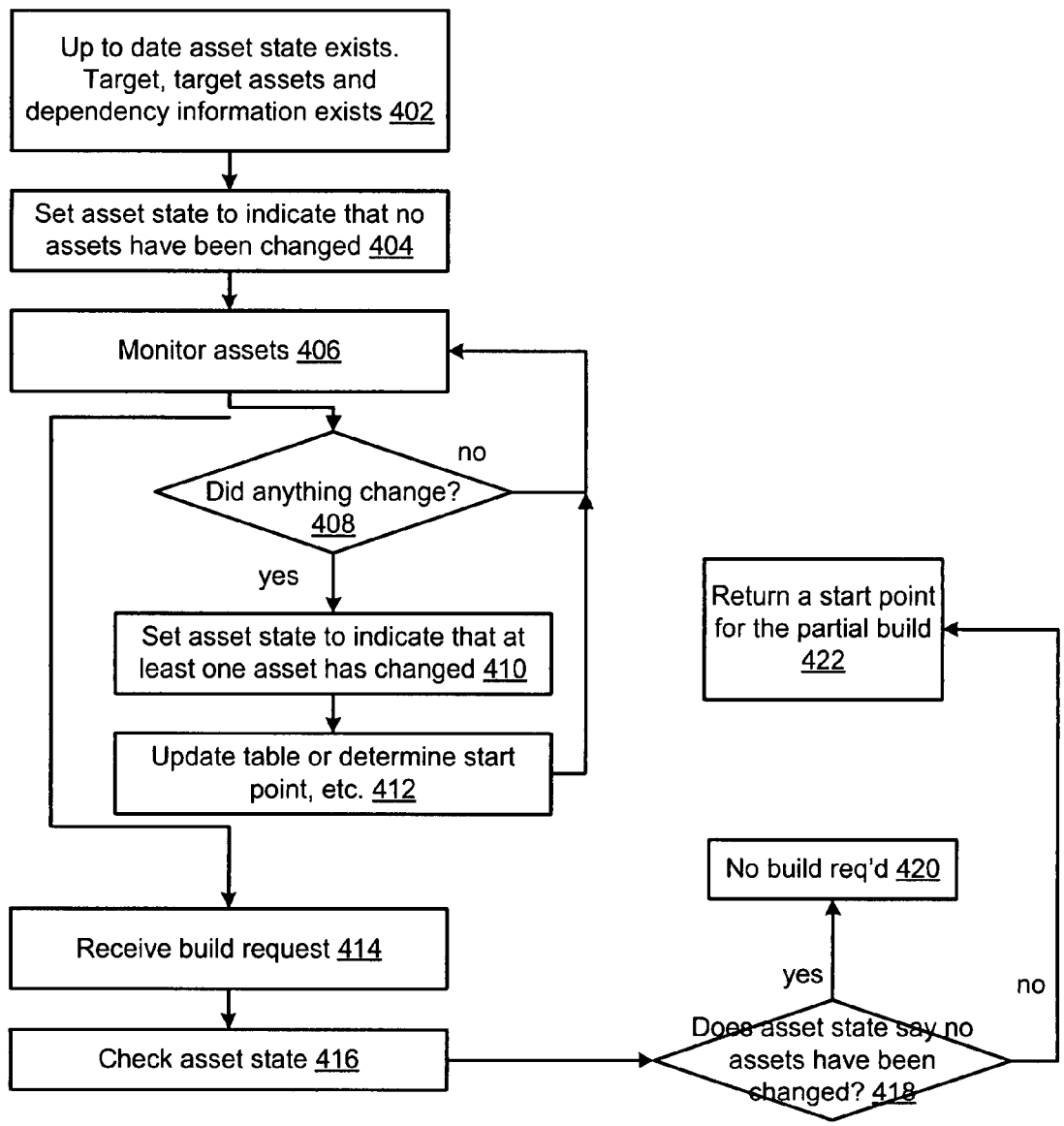
FIG. 4 is another flow diagram of an example of a method for using development asset state to enable a partial build in accordance with aspects of the subject matter disclosed herein.

Referring now to FIG. 4, an example of a more detailed method for using development asset state to enable a partial build is illustrated. At 402, information retained from a previous build is provided or is provided by an execution model or is provided manually or by other means, as described above. This information may include one or more of: a collection of targets for a particular build, a collection of assets (inputs to and outputs from) each of the targets of the collection, and the collection of targets upon which each target in the collection is dependent. At 404 asset state is initialized to some value indicating that no change to the assets has been detected and all assets are up to date. At 406 all of the inputs to and outputs from each of the targets in the collection are monitored. At 408 if the monitoring component detects a change to any input or output, the asset state is set to indicate that at least one asset has changed or has become out of date at 410.

At this point, a table of asset states may be updated to indicate that the changed asset is not up to date, a list of changed assets may be updated by adding to it the asset that changed or in some way, the state of the changed asset may be remembered (412). In alternative or in addition, at this point the targets affected by the changed asset(s) may be determined. The dependencies for each affected target may also be determined and a start point for a partial build may be determined (412). If a start point for a build is determined at this point, the start point may be overwritten by a future asset change only in the event that the new start point precedes the previously determined start point in the execution sequence. Monitoring continues until at 414, a build request is detected. At 416 the asset state is checked. If at 418 the asset state indicates that no assets have changed and therefore all development assets are up to date, no build is required (420) and this information can be immediately returned to the requestor. If at 418 the asset state indicates that at least one asset has changed, this information can be immediately returned to the requestor and a start point (determined as described above) for a partial build can be given to the build engine at 422.

It will be appreciated that methods for using development asset state to enable a partial build may be practiced using the system described above with respect to FIG. 1 and may be part of one or more IDEs as described below with respect to FIG. 6. These methods may be implemented on one or more computers such as the ones described below with respect to FIG. 6. Furthermore it will be appreciated that methods for using development asset state to enable a partial build may not require all the acts depicted or may be practiced in another order than that shown in FIG. 4.

Example of a Suitable Computing Environment

Figure 5:
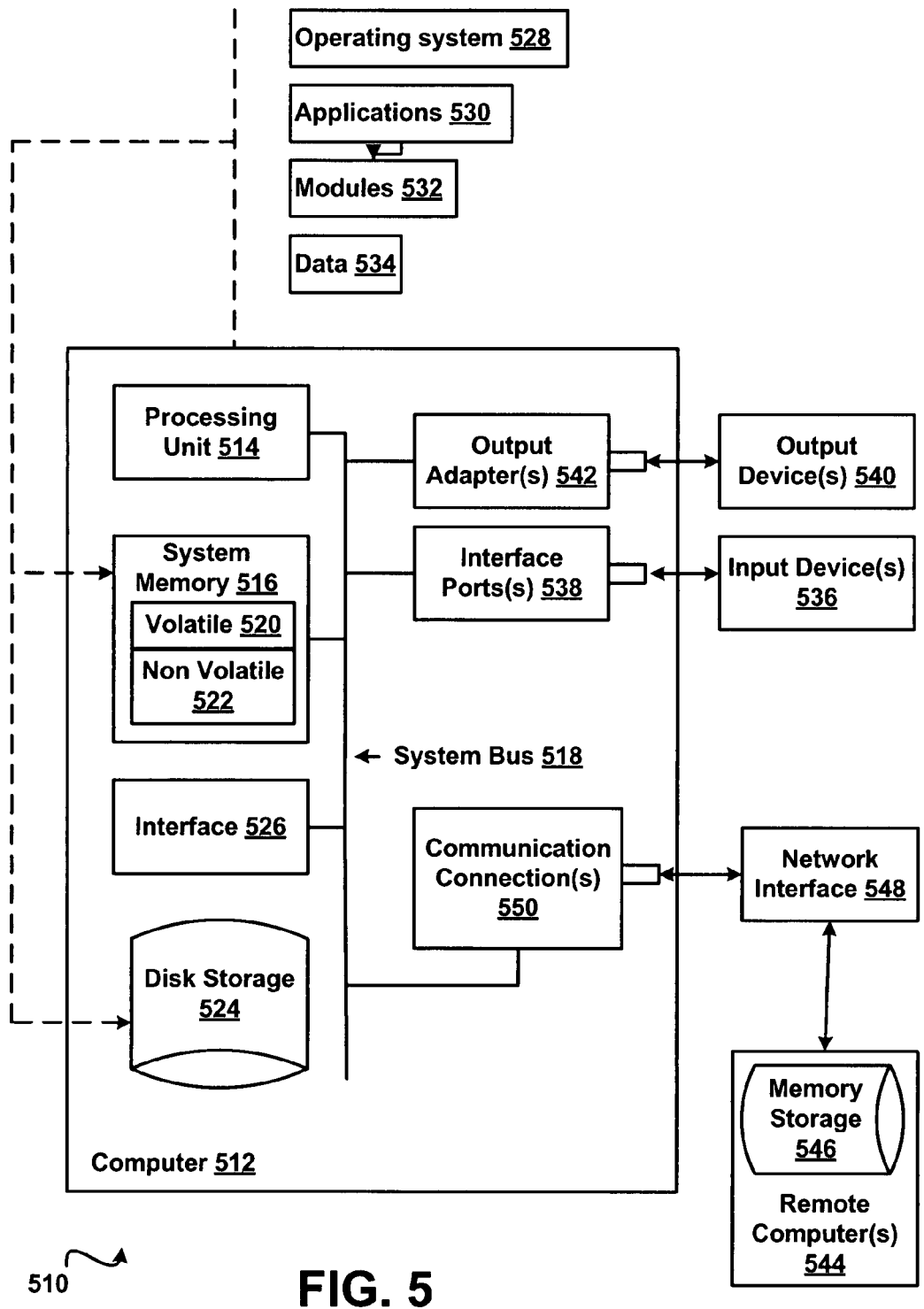
FIG. 5 is a block diagram illustrating an example of a computing environment in which aspects of the subject matter disclosed herein may be implemented.

In order to provide context for various aspects of the subject matter disclosed herein, FIG. 5 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, components, data structures, etc. that perform particular tasks or implement particular data types. Typically, the functionality of the program modules may be combined or distributed as desired in various embodiments. The operating environment 510 is only one example of a suitable operating environment and is not intended to limit the scope of use or functionality of the subject matter disclosed herein.

With reference to FIG. 5, a general purpose computing device in the form of a computer 512 is described. Computer 512 may include a processing unit 514, a system memory 516, and a system bus 518; The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system components including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 5 describes software that can act as an intermediary between users and computer resources. This software may include an operating system 528 which can be stored on disk storage 524, and which can control and allocate resources of the computer system 512. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require special adapters. Output adapters 542 include but are not limited to video and sound cards that provide a connection between the output device 540 and the system bus 518. It should be noted that other devices and/or systems or devices such as remote computer(s) 544 provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 5. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 510 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 6:
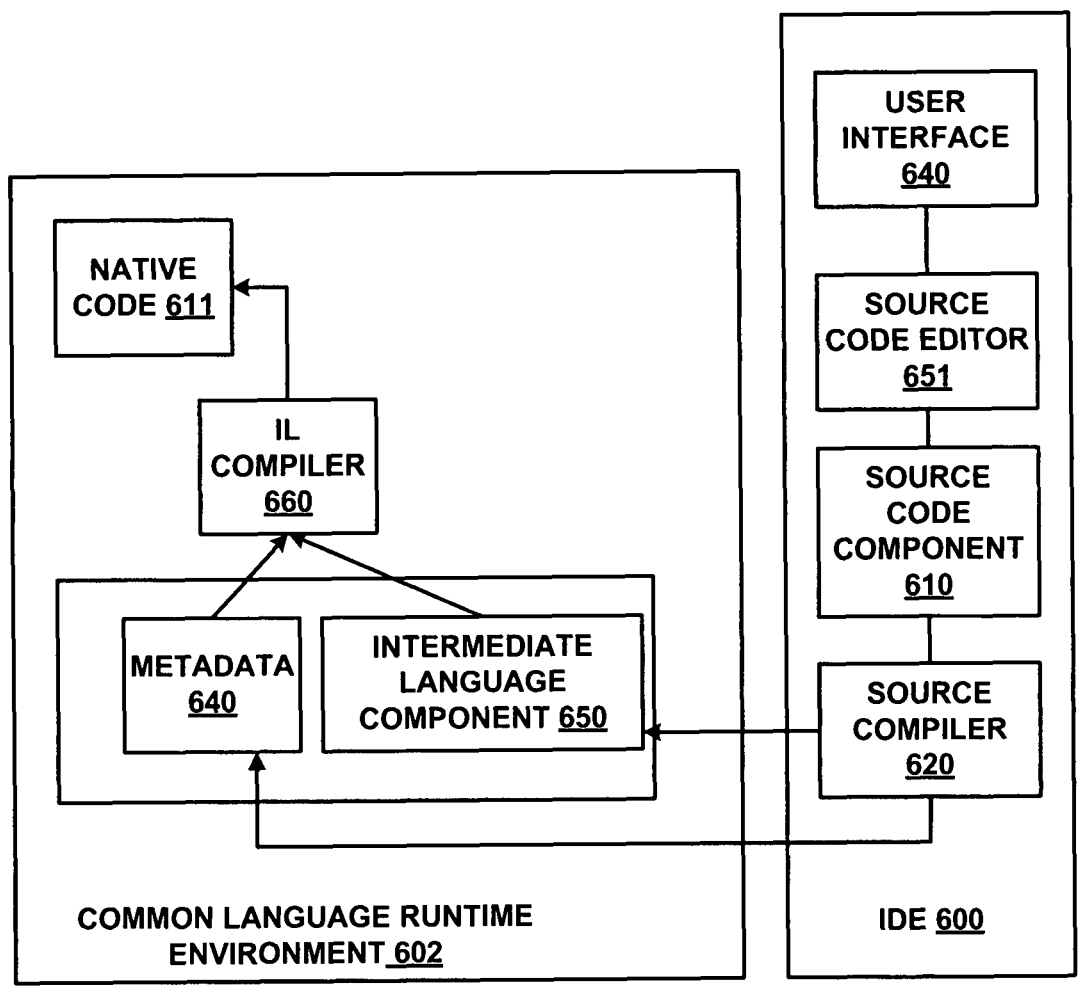
FIG. 6 is a block diagram of an example of an integrated development environment in accordance with aspects of the subject matter disclosed herein.

FIG. 6 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a managed code development environment using the NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 640. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A method of monitoring development asset state to determine if development assets are out of date comprising:
 initializing an asset state indicator on a computer to a single initialization value indicating that each of a plurality of development assets of a build process are up to date, in response to a known up to date state of all the development assets, wherein a collection of targets for the build process, a collection of development assets that comprise inputs and outputs to each of the targets in the collection of targets and a collection of dependencies between targets in the collection of targets are provided, from which an execution sequence for an operation of the build process based on the target dependencies is generated, wherein each target in the execution sequence groups build actions together in a particular order and provides an entry point into the execution sequence for the operation of the build process;
 monitoring each of the plurality of development assets for changes between build requests;
 returning a single current value of the asset state indicator in response to detecting a build request, the single current value indicating whether any of the plurality of development assets are out of date;

bypassing an individual up to date status evaluation of any of the plurality of development assets if the single current value of the asset state indicator is equivalent to the single initialization value, the bypassing facilitating an instantaneous determination that the build request does not require a corresponding build; and enabling an operation of a partial build process if the single current value of the asset state indicator is different than the single initialization value, wherein a modification of the single initialization value indicates that at least one of the plurality of development assets is not up to date, the partial build process limiting target executions to a set of affected targets prior to an initial execution of the execution sequence.

2. The method of claim 1, further comprising:

setting the asset state indicator to a second value different than the single initialization value, in response to detecting a change to at least one of the plurality of development assets of the build process, wherein the limiting comprises only executing a set of targets affected by the change.

3. The method of claim 2, further comprising:

returning the second value of the asset state indicator in response to detecting the build request.

4. The method of claim 3, further comprising:

determining a first-appearing affected target in an execution sequence of targets for the build process, wherein the first-appearing affected target is an earliest-appearing target in the execution sequence of the targets affected by any change in development assets detected by the monitoring act.

5. The method of claim 4, further comprising:

providing the first-appearing affected target to a build engine, wherein the build engine performs a partial build by executing each target in the execution sequence in turn, starting with the provided first-appearing affected target in the execution sequence and ending with a last target in the execution sequence.

6. The method of claim 1, wherein the execution sequence comprises a sequence of targets wherein a target in the sequence of targets in the execution sequence comprises at least one of a plurality of tasks, wherein the at least one task is a unit of executable code used by a build engine to perform atomic build operations, and wherein the plurality of tasks are executed in an order in which the plurality of tasks appears in the target and wherein each target in the execution sequence appears in the execution sequence in an order in which each target is executed.

7. The method of claim 6, wherein a development asset is an input to a target in the execution sequence or an output of a target in the execution sequence and wherein the development asset is up to date if an input of a first target is up to date with an output of the first target and wherein an output of a first target is up to date with an input of a second target, wherein the first target comes before the second target in the execution sequence.

8. The method of claim 7, wherein the input of the first target is up to date with the output of the first target if a timestamp of the input is less than or equal to a timestamp of the output, and wherein the output of the first target is up to date with the input of the second target if the timestamp of the output of the first target is less than or equal to a timestamp of the input of the second target.

9. A system configured to provide information concerning state of development assets comprising:

an asset state monitor executing on a computer configured to:

initialize an asset state indicator to a single initialization value indicating that each of a plurality of development assets of a build process are up to date, in response to a known up to date state of all the development assets, wherein a collection of targets for the build process, a collection of development assets that comprise inputs and outputs to each of the targets in the collection of targets and a collection of dependencies between targets in the collection of targets are provided, from which an execution sequence for an operation of the build process based on the target dependencies is generated, wherein each target in the execution sequence groups build actions together in a particular order and provides an entry point into the execution sequence for the operation of the build process;

monitor each of the plurality of development assets for changes between build requests;

return a single current value of the asset state indicator in response to detecting a build request, the single current value indicating whether any of the plurality of development assets are out of date;

bypass an individual up to date status evaluation of any of the plurality of development assets if the single current value of the asset state indicator is equivalent to the single initialization value, wherein the bypassing of the individual evaluation facilitates an instantaneous determination that the build request does not require a corresponding build; and enable an operation of a partial build process if the single current value of the asset state indicator is different than the single initialization value, wherein a modification of the single initialization value indicates that at least one of the plurality of development assets is not up to date, the partial build process limiting target executions to a set of affected targets prior to an initial execution of the execution sequence.

10. The system of claim 9, wherein the asset state monitor returns the single current value of the asset state indicator in response to detecting a build request.

11. The system of claim 9, wherein the asset state monitor returns a start point in an execution sequence for the build process.

12. The system of claim 9, wherein the build process comprises a plurality of targets executed in an execution sequence based on dependencies of targets and wherein the asset state monitor determines an earliest-appearing target affected by any change to the plurality of inputs and outputs detected by the asset state monitor.

13. The system of claim 9, wherein the asset state monitor is part of a managed code integrated development environment.

14. A computer-readable storage memory comprising computer-executable instructions that when executed in a computing environment, cause the computing environment to:

receive a collection of targets for a build process, a collection of development assets that comprise inputs and outputs to each of the targets in the collection of targets and a collection of dependencies between targets in the collection of targets, from which an execution sequence for an operation of the build process based on the target dependencies is generated, wherein each target in the execution sequence groups build actions together in a particular order and provides an entry point into the execution sequence for the operation of the build process;

initialize a development asset state indicator in response to a known up to date state of a plurality of development assets of the collection of development assets to a single initialization value indicating that each of the plurality of development assets of the build process are up to date;

monitor each of the plurality of development assets for changes between build requests;

return a single current value of the development asset state indicator in response to a build request, the single current value indicating whether any of the plurality of development assets are out of date;

bypass an individual up to date status evaluation of any of the plurality of development assets if the single current value of the development asset state indicator is equivalent to the single initialization value, wherein the bypassing of the individual evaluation facilitates an instantaneous determination that the build request does not require a corresponding build; and enable an operation of a partial build process if the single current value of the development asset state indicator is different than the single initialization value, the partial build process limiting target executions to a set of affected targets prior to an initial execution of the execution sequence.

15. The computer-readable storage memory of claim 14, comprising further computer-executable instructions that when executed in the computing environment, cause the computing environment to:

detect a change in a development asset comprising an input to or an output from at least one target in the first collection of targets or detect a change in a development asset comprising an input to or an output from at least one target in the second collection of targets; and in response to detecting the change, update the current value of the development asset state indicator to indicate that the development assets are not up to date.

16. The computer-readable storage memory of claim 15, comprising further computer-executable instructions that when executed in the computing environment, cause the computing environment to:

detect a build request; and in response to the detected build request, return the current value of the development asset state indicator.

17. The computer-readable storage memory of claim 16, comprising further computer-executable instructions that when executed in the computing environment, cause the computing environment to:

receive an execution sequence for the build process, wherein the execution sequence presents targets in an order in which the targets are executed to return each of the plurality of development assets of the build process to an up to date state.

18. The computer-readable storage memory of claim 17, comprising further computer-executable instructions that when executed in the computing environment, cause the computing environment to:

determine an entry point in the execution sequence wherein execution beginning at the entry point and executing each following target in turn ending with a last target, returns each of the plurality of development assets of the build process to an up to date state.

19. The computer-readable storage memory of claim 18, comprising further computer-executable instructions that when executed in the computing environment, cause the computing environment to:

determine the entry point in the execution sequence by determining a first-appearing target in the execution sequence affected by a detected change in a development asset of the build process.

20. The computer-readable storage memory of claim 19, comprising further computer-executable instructions that when executed in the computing environment, cause the computing environment to:

provide the entry point to a build engine to enable a partial build beginning at the entry point that returns each of the plurality of development assets to an up to date state.

* * * * *